Dec. 22, 1964

S. PAUL ETAL 3,162,859

MAGNETIZABLE MEMORY SYSTEM

Filed July 1, 1960

2 Sheets-Sheet 1

INVENTORS
SIEGFRIED PAUL
ALFONS HOPPMANN

BY

OSTROLENK, FABER, GERB & SOFFEN
ATTORNEYS

Dec. 22, 1964 S. PAUL ETAL 3,162,859

MAGNETIZABLE MEMORY SYSTEM

Filed July 1, 1960 2 Sheets-Sheet 2

INVENTORS
SIEGFRIED PAUL
ALFONS HOPPMANN
BY
OSTROLENK, FABER, GERB & SOFFEN
ATTORNEYS

United States Patent Office 3,162,859

Patented Dec. 22, 1964

3,162,859

MAGNETIZABLE MEMORY SYSTEM

Siegfried Paul and Alfons Hoppmann, Hannover, Germany, assignors to H. Wohlenberg, Kommanditgesellschaft, Hannover, Germany, a corporation of Germany Filed July 1, 1960, Ser. No. 40,367
Claims priority, application Germany, Sept. 9, 1959, W 26,346; Sept. 29, 1959, W 26,473
12 Claims. (Cl. 346—74)

Figure 1:
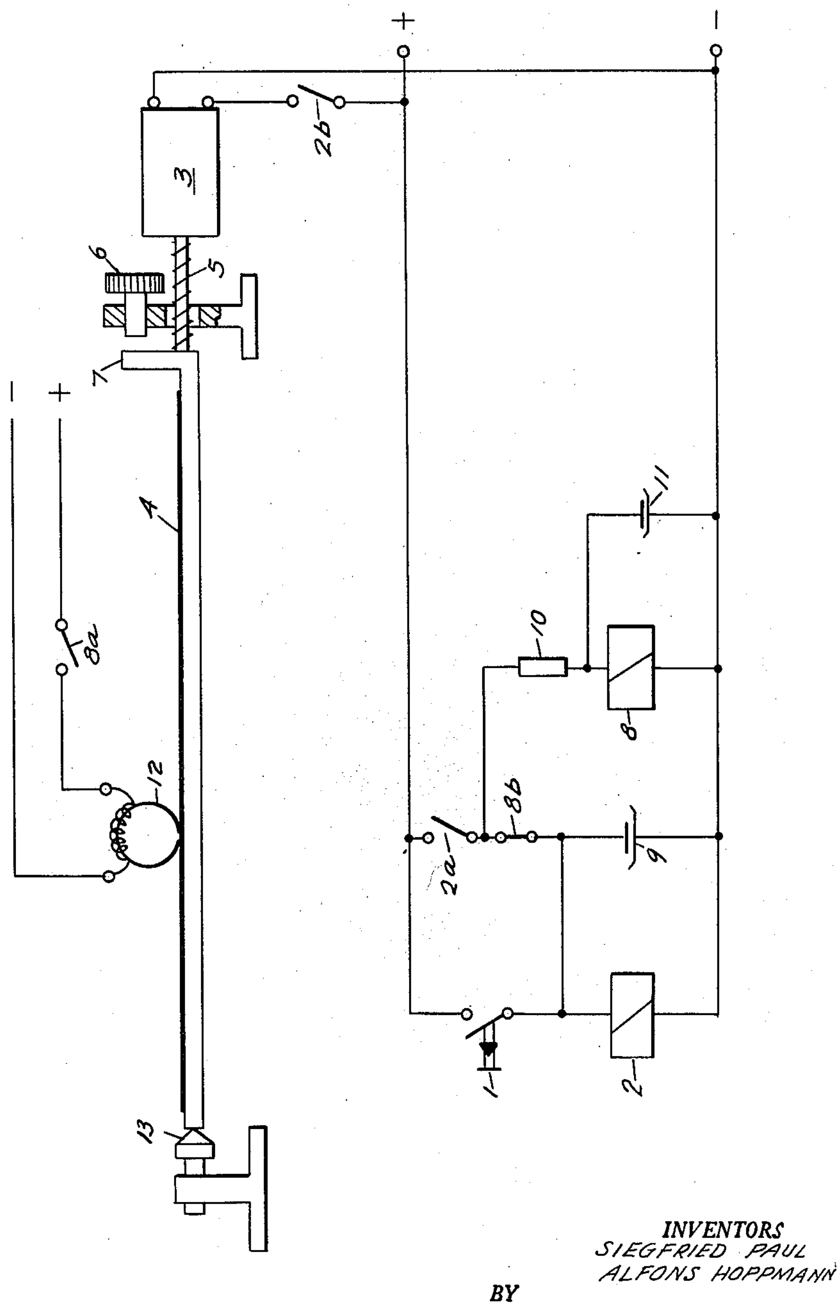

Using magnetizable memory element in the form of magnetic tape, magnetic wire or the like for controlling movements of machines, it must be taken into consideration when setting the pulse markings that the moment of inertia of the machine parts which are to be controlled results in a time delay for which compensation must be made in order to obtain optimum precision. Such time delay effects coasting or overtravel of machine parts beyond a desired stopping point in the course of their operation, or causes a lag in the movement of machine parts during the starting of motion. Accordingly there results a lack of precise synchronization between working portions of the machine, for example, the clamp or knife of a guillotine-type paper cutter, and the movement of a paper pile as effected by a saddle or back gauge.

This compensating is effected in prior art devices in that the magnetic head used for setting the pulse markings is shifted manually or by an electromagnet via a "setting" or "marking" switch by predetermined amount in a direction i.e. downstream of the direction of movement of the memory element with respect to the recording head opposite the pick-up direction thus the time elapsing from the moment of signal pick-up until the machine part controlled comes to a stop corresponds precisely to the travel time achieved by this handicapping or compensating. It is, therefore, absolutely necessary in these known devices that the person setting up the machine never forget to shift the magnetic head either manually or by operating the switch.

The present invention is primarily intended for automatic programming control of guillotine-type paper cutters wherein a back gauge, sometimes referred to as a saddle, pushes a paper pile into a particular position beneath a clamp and knife, so as to secure the pile at a precise line in accordance with the spacing of signals of a magnetic programming tape which moves in synchronization with the back gauge. It should be noted that the back gauge in each machine may move a distance of five or more feet but that the magnetic memory element, be it tape, or wire, or bar, can be of any shorter length just so long as its movement is synchronized in proportion to the movement of the back gauge. In normal preparation of the magnetic memory element, the back gauge is moved to certain measured positions and stopped at that point. Simultaneously the memory element is moved therewith, in synchronization, and likewise stops. At that time a recording head is pulsed to place a control signal on the memory element. Under actual operating conditions the mass of the back gauge and its actuating mechanism carries the back gauge beyond a theoretical instantaneous stopping point. Accordingly, the paper pile is not in exact cutting position. Likewise, in programming systems where the memory element controls the starting of a heavy mass such as a back gauge, it cannot start instantaneously and therefore there is a time lag again introduced which makes for lack of precision in the placing of the paper pile. Hence the need for downstream setting of the signal on the memory element to compensate for starting and stopping lag as effected by inertia of moving parts.

The object of the present invention is to provide a device which saves the operator of a machine controlled by magnetic pulse-markings storage the trouble of shifting the pick-up head by hand or actuating a special switch for the marking, and thus makes the machine foolproof.

A further improvement provided by the invention consists therein that not only do the above control processes take place automatically, but that even the turning on of this control is no longer effected by hand but by the machine itself, and therefore also automatically.

Figures 2, 3:
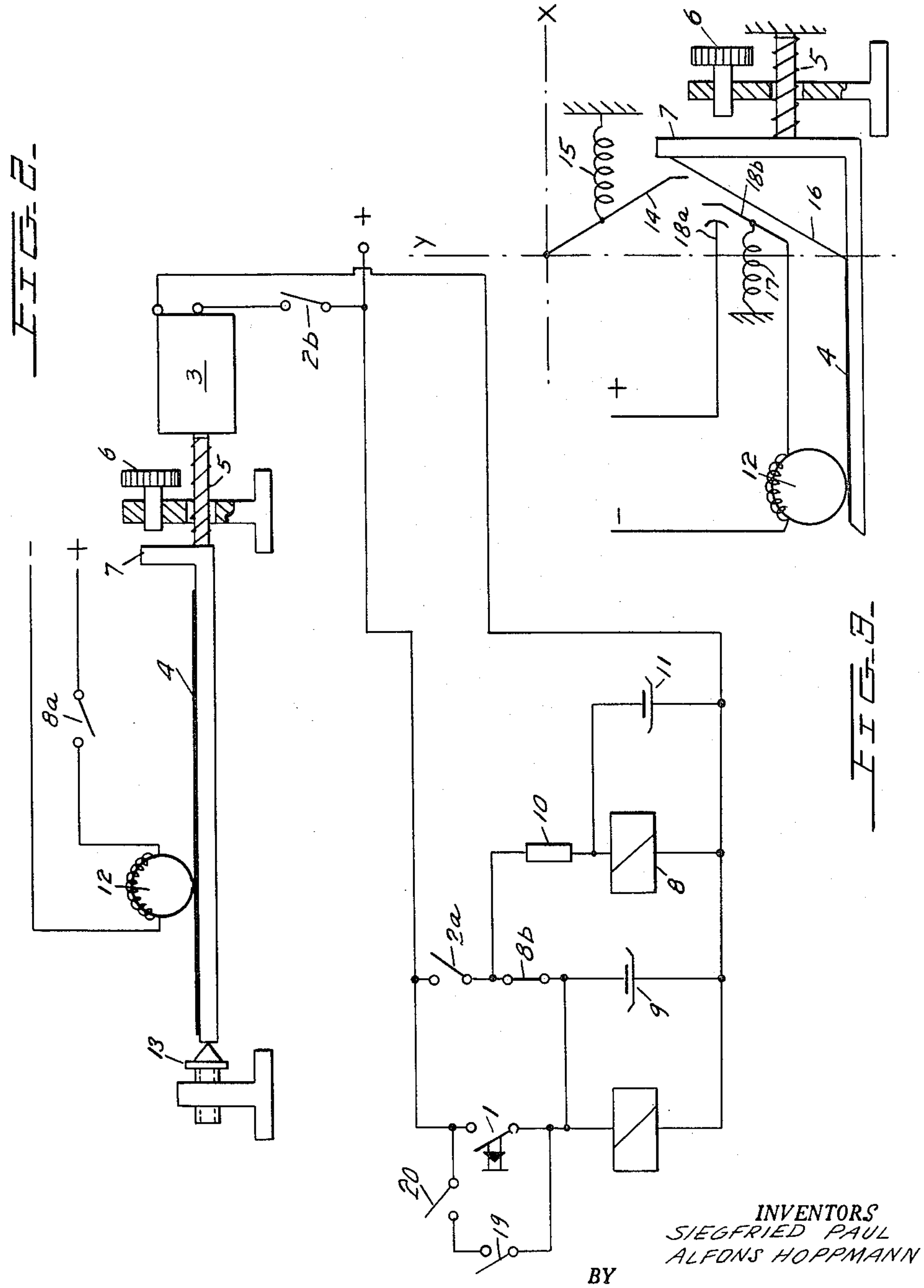

In the drawing, FIGURE 1 is an overall wiring diagram; FIGURE 2 shows the modified overall wiring diagram for the turning on of the control by the machine, and FIGURE 3 shows a further simplified circuit.

The apparatus in accordance with the invention has a push-button 1 for setting pulse markings, upon the actuation of which a relay 2 is energized and holds itself energized by virtue of its holding contact 2*a*. At the same time the contact 2*a* of this relay energizes an electromagnetic solenoid 3 which shifts a magnetizable memory element 4, carried on a suitable support as shown, in opposition to the force of the spring 5 by a distance which can be set by means of a screw 6 abutting against a stop or motion limiting shoulder 7 and also energizes a relay 8, with time delay. Relay 8 is energized by current through the holding contact 2*a* via the RC-combination consisting of the resistor 10 and the shunt capacitor 11. This relay 8, via its contact 8*a*, energizes the magnetic recording head to effect a magnetic marking or control signal on the magnetizable memory 4. Energization of relay 8 also causes the relay 2 to drop out because of opening of its normally closed contact 8*b* which occurs with time delay due to the capacitor 9 connected in parallel to the relay coil so that now the relay 8 also drops out, and the magnetizable memory 4, after the opening of the relay contact 2*b* and the deenergizing of the electromagnet 3 returns to the starting position due to the force of the spring 5, coming against the stop screw 13.

The circuit shown in FIGURE 2 corresponds to that of FIGURE 1, except that parallel to the setting push-button 1 there is located a bridge having two switches 20 and 19 which are actuated as follows:

The switch 19, "automatic programming," is turned on manually. The switch 20 can be controlled only by the machine itself. In accordance with the new method, this machine switch 20 which may be a cam switch and be arranged at any desired point in the path of a moving machine part, for example a knife or clamp of a paper cutter. Such switch may be a single or multiple switch which is actuated at the moment of the cutting and/or pressing of the stack of paper. Accordingly by having the machine itself provide the recording control on the memory element while the actual machine parts are moving, greatly improve correlation between the signal and the memory element, and the position of the machine parts is achieved. For example, in the case of a paper cutting machine, the saddle or back gauge has already been stopped in its motion prior to the clamp or knife coming down. This position of the saddle of the paper cutting machine at the moment of the cutting and/or pressing of the pile of paper is imparted as a magnetic marking to the magnetic support 4, this being done with a path handicap or motion compensation such as described above and in such a manner that now upon the repeated carrying out of the program, the saddle comes to a stop at precisely the same cutting and/or pressing place of the pile of paper.

After functioning of the switch 20, the switch 19 ("automatic programming") is again brought into open position in order to avoid the continuing simultaneous operation of the device. However, even if one forgets this operation—i.e., to open the switch 19—no error will result in the programming since then magnetic markings will be placed in precisely the same places as previously—only that they will be placed there several times. The machine switch 20 can have one or more contacts.

In accordance with the embodiment shown in FIGURE 3, a mechanical machine lever 14 is provided which can be moved both toward the direction X and toward the direction Y by the machine. At the moment of the pressing and/or cutting, the switch lever 14 moves down in the Y direction. Since the spring 15 is stronger than the spring 5, the switch lever forces the magnetic element support 4 to the right until it strikes against the set screw 6. The switch lever upon sliding downward on the oblique plane 16 moves further and further toward the left, finally pressing the contact arm 18b toward the left until contact is made with the stationary contact part 18 in opposition to the pressure of the spring 17. The circuit for the magnetic head 12 is now closed, as a result of which the magnetic marking is placed on the magnetic element which has been pulled to the right and displaced by the path handicap which is to be set. As soon as the switch lever again passes upward, it first of all releases the contact 18a, 18b which opens and de-energizes the magnetic head. Only thereupon when the switch lever again slides upward on the oblique plane 16 can the spring 5 again move the magnetic support 7 toward the left back into the starting position, precisely as described above in FIGURE 2.

The switch lever 14 is advisedly operated by hand when the first marking is set and no repetition is desired nor necessary. This can be done in a very simple manner by setting the switch arm 14 outside of the oblique plane 16 so that it cannot initiate any switching operations upon the upward and downward movement.

What is claimed is:

1. An actuating mechanism device for positioning a magnetizable memory element in a plurality of spaced positional relationships with respect to a reference point to correctly render the time relationship in a programmed sequence of operations controlled by pulsed magnetic memory impressions on said element, comprising a magnetic recording head, a magnetizable memory element, a positionally shiftable support for said element, means for shifting the position of said support, and means for effecting delayed energization of said recording head upon shift of position of said support.

2. An actuating mechanism device for positioning a magnetizable memory element in a plurality of spaced positional relationships with respect to a reference point to correctly render the time relationship in a programmed sequence of operations controlled by pulsed magnetic recording head, a magnetizable memory element and means for physically shifting the relative position of said memory element and said head to a predeterminable degree, a time delay circuit for effecting a signal pulse in said head, means for energizing said circuit responsive to said shifting.

3. A system for placing a signal on a magnetizable memory element in a positional relationship with respect to a point thereon corresponding to the desired stopping point of a machine mechanism, comprising a magnetic recording head, a magnetizable memory element, a positionally shiftable support for said element having an initial position relative said head, means for shifting the position of said support, adjustable means for actuating said shifting means for a predeterminable distance to compensate for a known degree of overtravel of said machine mechanism, and means for returning said shiftable support to an initial position.

4. An actuating mechanism device for positioning a magnetizable memory element in a plurality of spaced positional relationships with respect to a reference point to correctly render the time relationship in a programmed sequence of operations controlled by pulsed magnetic memory impressions on said element, comprising a magnetic recording head, a magnetizable memory element, said head and element adapted to be positionally shiftable relative each other from an initial relative position, shifting means, return means for returning said head and element to said initial relative position, means for energizing said magnetic recording head operatively connected with said shifting means, and means operatively connected to said shifting means to de-energize said recording head upon operation of said return means for returning said support.

5. In a system of the class described for control of machine parts in program operation of a machine, a memory element and a recording head, means maintaining said head and element in an initial position with respect to each other, and shifting means for effecting a predetermined degree of change in said initial position to compensate for inertia effects of machine parts, said shifting means comprising an electrically energizable device, control means for energizing said device to effect said shift in relative position, and means for energizing said head to record a signal on said memory element, said latter means being operative subsequent to functioning of said electrically energizable means.

6. In a system as set forth in claim 5, including a support for said memory element, means for biasing said support to effect said initial relative position of said memory element and said head subsequent to de-energization of said energizable element.

7. In a system as set forth in claim 5, including a support for said memory element, means for biasing said support to effect said initial relative position of said memory element and said head subsequent to de-energization of said energizable element, said support element having an abutment shoulder, and manually adjustable means settable with respect to said shoulder to be abutted thereby for predetermining the degree of movement of said support element upon energization of said energizable element.

8. In a system as set forth in claim 5, said control mean comprising an electrical circuit having a manually operable switch for effecting energizing control of said electrically energizable device.

9. In a system as set forth in claim 5, said control means comprising an electrical circuit having a switch operable by a machine part at a predetermined position for effecting energizing control of said electrically energizable device.

10. In a system of the class described, for control of machine parts in a program operated machine, a memory element and a recording head, means maintaining said head and element in an initial position with respect to each other and shifting means for effecting a predetermined degree of change in said initial position to compensate for an inertia effect of machine parts, said shifting means comprising a movable element abuttable by a machine part for shifting said memory element and being operatively connected thereto, said shifting means also comprising switch means disposed in the path of movement of said movable element for subsequent engagement thereby to control energization of said recording head for recording a signal on said memory element.

11. In a system as set forth in claim 10, including a support for said memory element, means for biasing said support to effect said initial, relative position of said memory element with respect to said recording head, said support comprising a cam having an elongated cam surface, said movable element being engageable with and slidable along said surface and being thereby effective to shift said support, said switch means being at a predetermined position with respect to said cam so as to be engaged at a predetermined time in the course of movement of said movable element along said cam surface for effecting a delay in actuation of said switch means, whereby said head is energized subsequent to shifting of said support.

12. An actuating mechanism device for positioning a magnetizable memory element in a plurality of spaced positional relationships with respect to a reference point to correctly render the time relationship in a programmed sequence of operations controlled by pulsed magnetic memory impressions on said element, comprising a magnetic recording head, a magnetizable memory element, a positionally shiftable support for said element, means for shifting said support to a different position, means for returning said support to its original position, recording control means for energizing said magnetic recording head operatively connected with said shifting means whereby said recording control means is effective responsive to operation of said shifting means; the shifting means being actuated by an automatically operated switch operatively connected to a moving machine element of a programmed machine tool.

References Cited in the file of this patent

UNITED STATES PATENTS

| | | |
|---|---|---|
| 2,656,419 | Dingley | Oct. 20, 1953 |
| 2,986,725 | Dirks | May 30, 1961 |